(12) United States Patent
Tian et al.

(10) Patent No.: US 10,007,141 B2
(45) Date of Patent: Jun. 26, 2018

(54) DISPLAY PANEL AND DISPLAY DEVICE

(71) Applicants: BOE Technology Group Co., Ltd., Beijing (CN); Hefei Xinsheng Optoelectronics Technology Co., Ltd., Hefei (CN)

(72) Inventors: Jian Tian, Beijing (CN); Ming Hu, Beijing (CN); Guiyu Zhang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 0 days. days.

(21) Appl. No.: 15/503,981

(22) PCT Filed: Jul. 22, 2016

(86) PCT No.: PCT/CN2016/091010
§ 371 (c)(1),
(2) Date: Feb. 14, 2017

(87) PCT Pub. No.: WO2017/128651
PCT Pub. Date: Aug. 3, 2017

(65) Prior Publication Data
US 2018/0120632 A1    May 3, 2018

(30) Foreign Application Priority Data
Jan. 28, 2016 (CN) .......................... 2016 1 0059548

(51) Int. Cl.
*G02F 1/1335* (2006.01)
*G02F 1/1333* (2006.01)
*G06F 3/041* (2006.01)

(52) U.S. Cl.
CPC .... *G02F 1/133524* (2013.01); *G02F 1/13338* (2013.01); *G02F 1/133308* (2013.01); *G06F 3/0412* (2013.01); *G02F 2001/133317* (2013.01)

(58) Field of Classification Search
CPC .......... G02F 1/13; G02F 1/139; G02F 1/1335; G02F 3/42; G02F 3/44; G02F 3/412;
(Continued)

(56) References Cited

U.S. PATENT DOCUMENTS 9,182,542 B2    11/2015  Wu
2004/0160556 A1*  8/2004  Tsuchiya ........... G02F 1/133555
                                                         349/114
(Continued)

FOREIGN PATENT DOCUMENTS

CN    102914897 A    2/2013
CN    103984127 A    8/2014
(Continued)

OTHER PUBLICATIONS

Oct. 26, 2016—International Search Report and Written Opinion Appn PCT/CN2016/091010 with Eng Tran.
(Continued)

*Primary Examiner* — Xiaoliang Chen
(74) *Attorney, Agent, or Firm* — Banner & Witcoff, Ltd.

(57) ABSTRACT

A display panel includes a first substrate and a second substrate The first substrate includes a first central display region and a first margin region; the second substrate includes a second central display region, a second margin region, and a light guide element arranged between the first substrate and the second substrate. The light guide element includes a first optical component which partially overlays the first central display region and a second optical component which is located on a side surface of the second margin (Continued)

region. The first optical component is configured to allow part of light from the first central display region to exit from a top surface of the second margin region, and allow another part of light from the first central display region to exit from a top surface and a side surface of the second optical component.

20 Claims, 2 Drawing Sheets

(58) Field of Classification Search
CPC ......... G02F 3/416; H01L 33/00; H01L 33/32; H01L 33/42; H01L 33/44; H01L 33/58; H01L 33/60; H01L 33/62
USPC ....... 174/250; 257/76, 79, 98; 345/175, 213; 349/64, 111, 114; 359/465, 566
See application file for complete search history.

(56) References Cited

U.S. PATENT DOCUMENTS

| | | | |
|---|---|---|---|
| 2011/0157097 A1* | 6/2011 | Hamada | G02F 1/13338 345/175 |
| 2011/0175124 A1* | 7/2011 | Bae | H01L 33/44 257/98 |
| 2011/0193093 A1* | 8/2011 | Park | H01L 33/025 257/76 |
| 2011/0198618 A1* | 8/2011 | Jeong | H01L 33/42 257/79 |
| 2014/0043550 A1 | 2/2014 | Chen et al. | |
| 2015/0362638 A1 | 12/2015 | Wang | |
| 2017/0146840 A1 | 5/2017 | Dai et al. | |
| 2017/0160586 A1 | 6/2017 | Xiao | |

FOREIGN PATENT DOCUMENTS

| | | |
|---|---|---|
| CN | 104062795 A | 9/2014 |
| CN | 104062805 A | 9/2014 |
| CN | 204009805 U | 12/2014 |
| CN | 104461114 A | 3/2015 |
| CN | 104503115 A | 4/2015 |
| CN | 104516137 A | 4/2015 |
| CN | 104516557 A | 4/2015 |
| CN | 105511149 A | 4/2016 |
| CN | 106405723 A | 2/2017 |
| KR | 20140142418 A | 12/2014 |

OTHER PUBLICATIONS

Apr. 4, 2018—(CN) First Office Action Appn 201610059548.2 with English Tran.

* cited by examiner

DISPLAY PANEL AND DISPLAY DEVICE

CROSS-REFERENCE TO RELATED APPLICATIONS

The application is a U.S. National Phase Entry of International Application No. PCT/CN2016/091010 filed on Jul. 22, 2016, designating the United States of America and claiming priority to Chinese Patent Application No. 201610059548.2 filed on Jan. 28, 2016. The present application claims priority to and the benefit of the above-identified applications and the above-identified applications are incorporated by reference herein in their entirety.

TECHNICAL FIELD

The present disclosure relates to field of manufacturing liquid crystal products, more specifically, to a display panel and a display device.

BACKGROUND

Currently, in the display device industry, frames of the devices are designed to have a large amount of conductive metals or other materials so as to make sure the signal is transmitted effectively. In order to prevent circuit lines from being visible and thus affecting the aesthetics, frames are usually designed to be black. However, the designs of frames structure or black ink coating would delimit a border of the image displayed by the display device. Particularly, in the case of current increasing quality demanding for image display, image switch and the like, a visible physical frame structure would affect the aesthetics and the comfort degree of the human-computer interface.

SUMMARY

To solve the above technical problems, the present disclosure provides a display device in which the frame boundary of the display panel can be weaken and thus a non-frame full-screen display is realized.

In order to achieve the above purposes, an embodiment of the present disclosure provides a display panel, which comprises: a first substrate, comprising a first central display region and a first margin region; a second substrate, comprising a second central display region and a second margin region; and a light guide element, arranged between the first substrate and the second substrate and comprising a first optical component which partially overlays the first central display region and a second optical component which is located on a side surface of the second margin region. The first optical component is configured to allow part of light from the first central display region to exit from a top surface of the second margin region, and allow another part of light from the first central display region to exit from a top surface and a side surface of the second optical component.

Further, the top surface and the side surface of the second optical component are provided with concave-convex structure which is configured to allow the light to be refracted and exit.

Further, the top surface of the first optical component is provided with concave-convex structure which is configured to allow the light to be refracted and exit.

Further, an area of the first central display region is larger than an area of the second central display region.

Further, an orthographic projection of the first optical component on the second substrate is located within the second margin region.

Further, the top surface of the second optical component is in a same horizontal plane as a top surface of the first substrate.

Further, a wiring in the second margin region is made of semi-transparent material, or made of transparent electrically conductive material.

Further, the wiring in the second margin region is made of ITO, nano-silver or graphene.

Further, the first optical component is arranged parallel to the first substrate, the second optical component is arranged perpendicular to the first substrate, and the first optical component and the second optical component are connected with each other and form an L-shape.

Further, the first substrate is a driving substrate, and the second substrate is a touch sensitive substrate.

Another embodiment of the present disclosure further provides a display device, which comprises a backlight source, a frame and the aforementioned display panel Further, the second optical component is located on the frame, and the side surface of the second optical component is aligned with an outer side surface of the frame.

Further, an end surface of the frame is aligned with a surface of the first substrate that faces the second substrate.

Further, the light guide element of the display panel is made of a same material as a light guide plate of the backlight source.

The advantages of the technical solution in the present disclosure are as follows: the arrangement of light guide element allows the images to be displayed in the margin area and thus the frame boundary of the display panel is weakened, thereby improving the human-computer interface and providing better display effect.

DETAILED DESCRIPTION

The features and the principals of the present disclosure will be described in the following in connection with the drawings. Apparently, the described embodiments are just a part but not all of the embodiments of the disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising,"

"includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
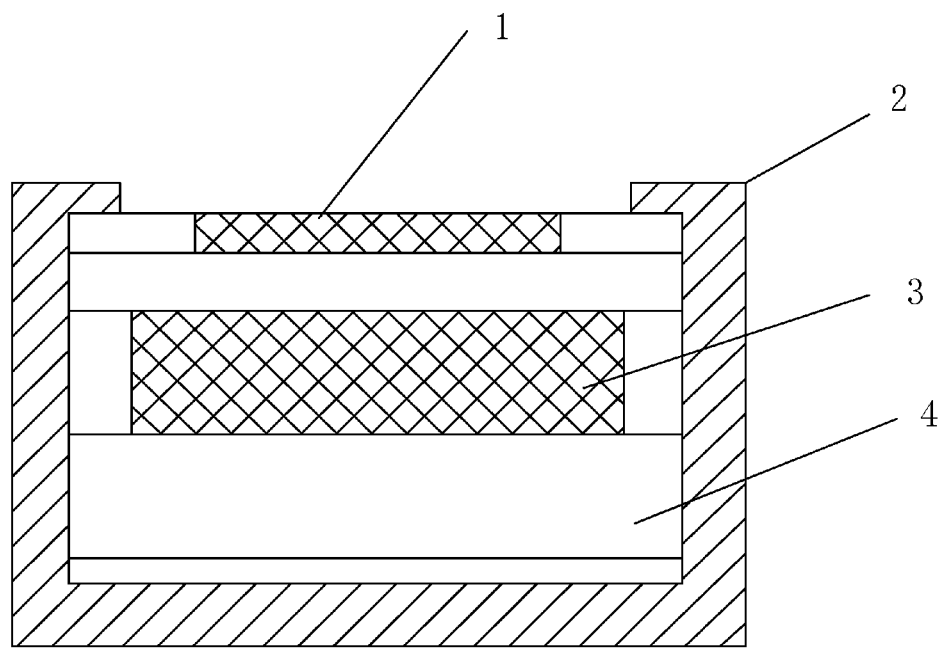
FIG. 1 schematically illustrates a display device.

As illustrated in FIG. 1, a display device comprises a backlight source 4, a first substrate 3, a second substrate 1, and a frame 2 arranged around the backlight source 4, the first substrate 3 and the second substrate 1. However, the design of frames structure or black ink coating would delimit a border of the image displayed by the display device. Particularly, in the case of current increasing quality demanding for image display, image switch and the like, a visible physical frame structure would affect the aesthetics and the comfort degree of the human-computer interface.

Figure 2:
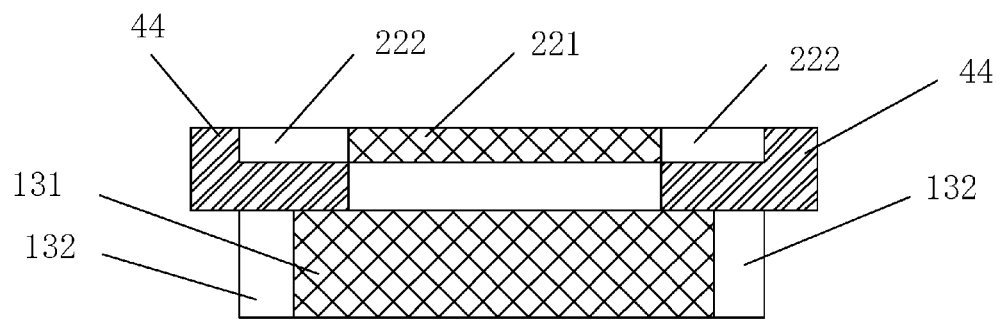
FIG. 2 schematically illustrates a display panel of an embodiment of the present disclosure.
Figure 4:
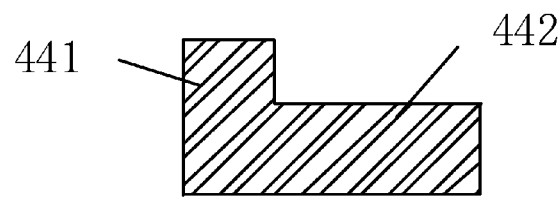
FIG. 4 schematically illustrates a light guide element of an embodiment of the present disclosure.

As illustrated in FIG. 2 and FIG. 4, the present disclosure provides a display panel comprising a first substrate and a second substrate. The first substrate comprises a first central display region 131 and a first margin region 132. The second substrate comprises a second central display region 221, a second margin region 222 and light guide element 44 arranged between the first substrate and the second substrate. The light guide element 44 comprises a first optical component 442 partially overlaying the first central display region 131, and a second optical component 441 located on a side surface of the second margin region 222.

The first optical component 442 could enable part of the light from the first central display region 131 to exit from the top surface of the second margin region 222, and enable another part of the light from the first central display region 131 to exit from the top and side surfaces of the second optical component 441.

Figure 5:
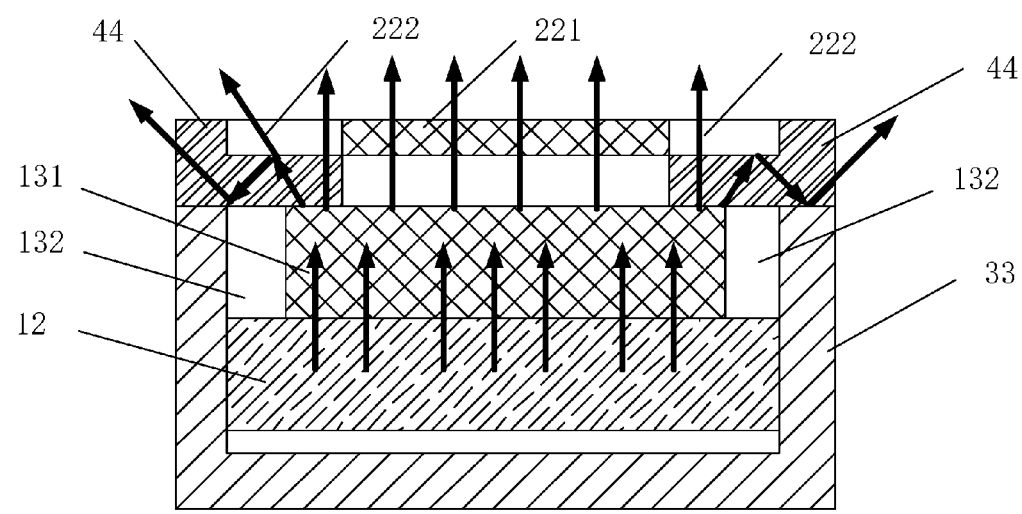
FIG. 5 schematically illustrates the path of the light exiting from the backlight source according to an embodiment of the present disclosure.

The arrows illustrated in FIG. 5 illustrate the paths of the light. Part of the light from the first central display region 131 directly exits from the second central display region 221. The first optical component 442 is arranged to enable part of the light from the first central display region 131 to exit from the top surface of the second margin region 222. And the first optical component 442 is further arranged to enable part of the light from the first central display region 131 to enter into the second optical component 441. The second optical component 441 is arranged to enable the light entering into it to exit from the top and side surfaces of the second optical component 441 after the light phenomenon is occurred, such as being reflected, refracted and the like. Therefore, the arrangement of the light guide element 44 can make the image displayed in the margin region and the side surface of the display panel, thereby weakening the frame boundary of the display panel, significantly increasing the human-computer interface, and providing better display effect.

As illustrated in FIG. 2 to FIG. 5, the first optical component 442 is arranged parallel to the first substrate, the second optical component 441 is arranged vertical to the first substrate. The first optical component 442 and the second optical component 441 are connected with each other and form an L-shape.

In the present embodiment, the first optical component and the second optical component are formed integrally.

The first optical component 442 partially overlays the first central display region 131. As illustrated in FIG. 5, the first optical component 442 is arranged to overlay the margin portion of the first central display region 131, such that part of light from the first central display region 131 could enter into the first optical component 442 and the first optical component 442 would not affect the display effect of the second central display region 221.

Furthermore, in order to prevent the light entering into the light guide element 44 from being totally reflected and make at least a part of the light be refracted and exit, the top surface of the first optical component 442 is provided with a concave-convex structure which allows the light to be refracted and then exit. Both the top surface and the side surface of the second optical component 441 are provided with concave-convex structure which could enable the light to be refracted and then exit.

The arrangement of the concave-convex structure can prevent the light from being total reflected at the top surface and the side surface of the second optical component 441, such that the light can be refracted and exit, and the images can be displayed.

The number and arrangement forms of the concave-convex structures may be various, as long as the light could be prevented from total reflection and make the light being refracted and exit.

To prevent the second central display region 221 from being interfered by the light guide element 44, the area of the first central display region 131 is larger than the area of the second central display region 221.

Furthermore, in order to ensure that the arrangement of the light guide element 44 would not affect the display effect of the second central display region 221, the orthographic projection of the first optical component 442 on the second substrate is located within the second margin region 222.

Furthermore, the top surface of the second optical component 441 is in the same horizontal plane as the top surface of the first substrate. This configuration could make the appearance of the display panel more artistic and avoid affecting the visual experience due to the height difference across the display panel.

Furthermore, the wirings in the second margin region 222 are made of semi-transparent (the light transmittance is approximately 50%) or transparent electrically conductive materials.

In the present embodiment, the second margin region 222 does not undergo the light blocking treatment, such as coating light blocking material on the second margin region 222. If margin region needs to display in a special color, the light-colored ink or ink in other colors may be adopted to decorate the second margin region, so as to ensure that the light from the first central display region 131 could travel to the eyes of the viewer without being blocked.

As an example, the wiring in the second margin region 222 according to the present embodiment is made of ITO (indium tin oxide), nano-silver or graphene.

In the present embodiment, the display panel is touch sensitive panel, the first substrate is a driving substrate, and the second substrate is a touch sensitive substrate.

It is noted that, the display panel according to the present embodiment is not limited to the touch sensitive panel, and includes other display panel, which could realize the same effect.

Figure 3:
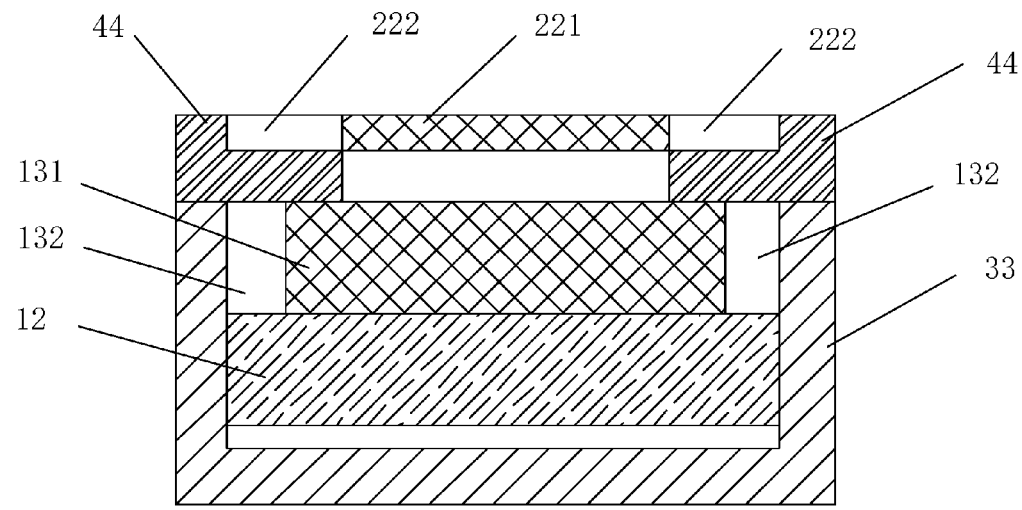
FIG. 3 schematically illustrates a display device of an embodiment of the present disclosure.

As illustrated in FIG. 3, the present disclosure further provides a display device comprising a backlight source 12, a frame 33 and the aforementioned display panel.

Furthermore, the second optical component 441 is located above the frame 33, and the side surface of the second optical component 441 is aligned with the outer side surface of the frame 33.

As illustrated in FIG. 3, the end surface of the frame 33 is aligned with the primary surface of the first substrate that faces the second substrate. The second optical component 441 substitutes a portion of the frame, thereby weakening the frame boundary and increasing the visual experience.

The display panel in the present embodiment will integrally present an image. The second margin region 222 and the top surface and the side surface of the second optical component 441 could display continuous image and color, thereby producing a better visual experience to the viewer.

Moreover, the second margin region 222 and the second optical component 441 may be frosted, fuzzified, or colored, or in a mesh form, so that a frosted frame, a fuzzification frame, or a frame with a certain color is realized. Whatever the frame is arranged in any form, images could be displayed in the margin region of the display panel.

In the present embodiment, the light guide element 44 may be made of the same material as the light guide plate of the backlight source. For example, the light guide plate uses optical acrylic/PC sheet as its substrate, and then light guide dots, which are made of materials having high reflectivity and no light absorption, are formed on the bottom surface of the substrate through UV screen printing. The light guide element 44 which is made of the same material as the light guide plate can guide light easily.

The above embodiments are preferred embodiments of the present disclosure. It is noted that, those skilled in the art could make improvements and modifications, which should be considered falling into the scope of the present disclosure, without going beyond the principle of the present disclosure.

The invention claimed is:

1. A display panel comprising:
   a first substrate, comprising a first central display region and a first margin region;
   a second substrate, comprising a second central display region and a second margin region; and
   a light guide element, arranged between the first substrate and the second substrate and comprising a first optical component which partially overlays the first central display region and a second optical component which is located on a side surface of the second margin region;
   wherein the first optical component is configured to allow part of light from the first central display region to exit from a top surface of the second margin region, and allow another part of light from the first central display region to exit from a top surface and a side surface of the second optical component.

2. The display panel of claim 1, wherein the top surface and the side surface of the second optical component are provided with concave-convex structure which is configured to allow the light to be refracted and exit.

3. The display panel of claim 1, wherein the top surface of the first optical component is provided with concave-convex structure which is configured to allow the light to be refracted and exit.

4. The display panel of claim 1, wherein an area of the first central display region is larger than an area of the second central display region.

5. The display panel of claim 1, wherein an orthographic projection of the first optical component on the second substrate is located within the second margin region.

6. The display panel of claim 1, wherein the top surface of the second optical component is in a same horizontal plane as a top surface of the first substrate.

7. The display panel of claim 1, wherein a wiring in the second margin region is made of semi-transparent material, or made of transparent electrically conductive material.

8. The display panel of claim 7, wherein the wiring in the second margin region is made of ITO, nano-silver or graphene.

9. The display panel of claim 1, wherein the first optical component is arranged parallel to the first substrate, the second optical component is arranged perpendicular to the first substrate, and the first optical component and the second optical component are connected with each other and form an L-shape.

10. The display panel of claim 1, wherein the first substrate is a driving substrate, and the second substrate is a touch sensitive substrate.

11. A display device comprising a backlight source, a frame and the display panel of claim 1.

12. The display device of claim 11, wherein the second optical component is located on the frame, and the side surface of the second optical component is aligned with an outer side surface of the frame.

13. The display device of claim 11, wherein an end surface of the frame is aligned with a surface of the first substrate that faces the second substrate.

14. The display device of claim 11, wherein the light guide element of the display panel is made of a same material as a light guide plate of the backlight source.

15. The display device of claim 11, wherein the top surface and the side surface of the second optical component are provided with concave-convex structure which is configured to allow the light to be refracted and exit.

16. The display device of claim 11, wherein the top surface of the first optical component is provided with concave-convex structure which is configured to allow the light to be refracted and exit.

17. The display device of claim 11, wherein an area of the first central display region is larger than an area of the second central display region.

18. The display device of claim 11, wherein an orthographic projection of the first optical component on the second substrate is located within the second margin region.

19. The display device of claim 11, wherein the top surface of the second optical component is in a same horizontal plane as a top surface of the first substrate.

20. The display device of claim 11, wherein a wiring in the second margin region is made of semi-transparent material, or made of transparent electrically conductive material.

* * * * *